125,449

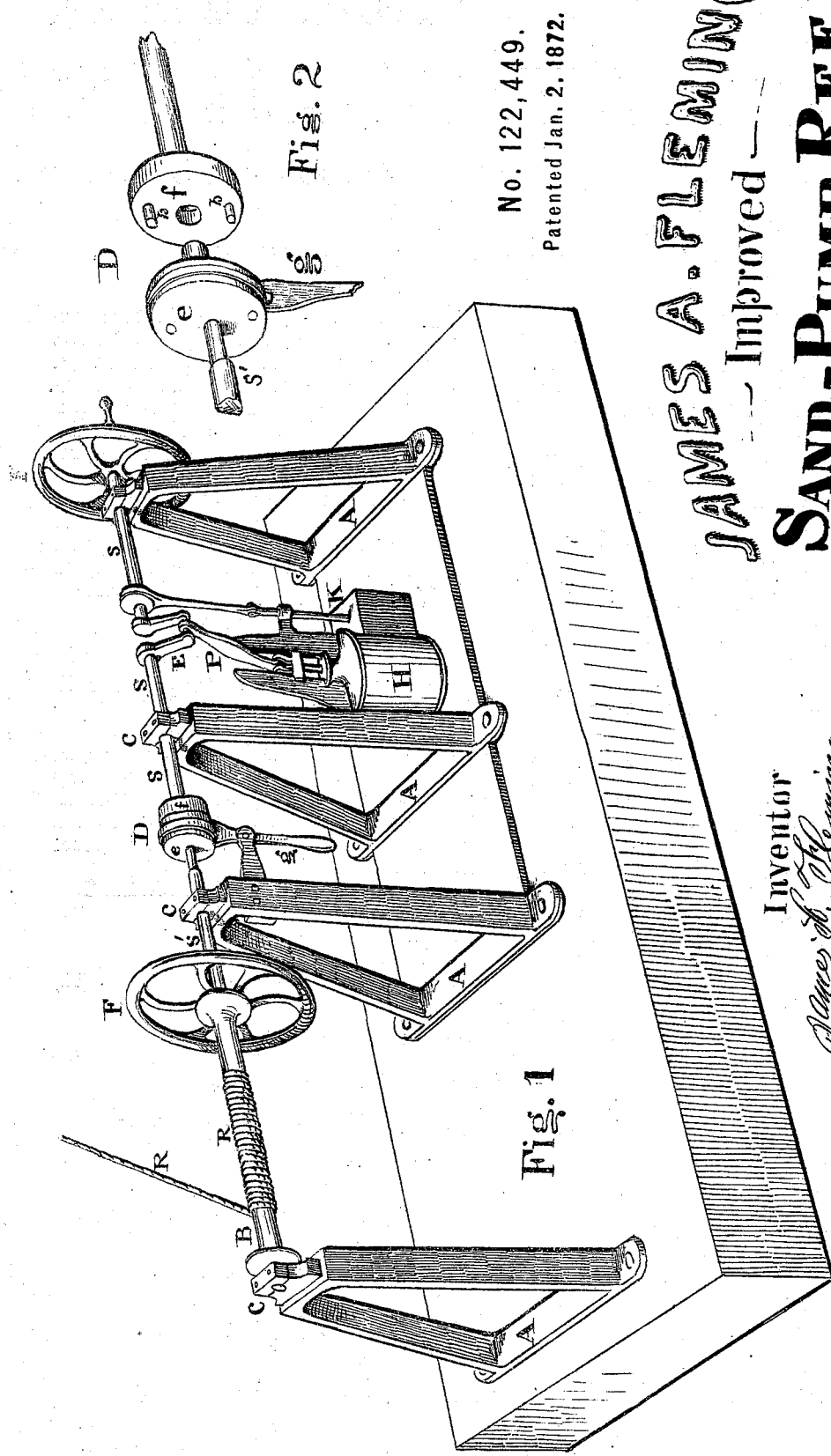

UNITED STATES PATENT OFFICE.

JAMES A. FLEMING, OF SHAMBURG, PENNSYLVANIA.

IMPROVEMENT IN SAND-PUMPS AND REELS FOR ARTESIAN WELLS.

Specification forming part of Letters Patent No. 122,449, dated January 2, 1872.

I, JAMES A. FLEMING, of Shamburg, Venango county, Pennsylvania, have invented an Improved Sand-Pump Reel for Artesian Wells, of which the following is a specification, reference being had to the accompanying drawing, of which—

Figure 1 is a general perspective view, showing the clutch D closed, and Fig. 2 an enlarged view of the clutch D open.

Nature and Object of Invention.

The object of my invention is to provide a reel for the rope or cord used in sand-pumping artesian wells, which shall be operated by a motive power more efficient and more directly under the control of the workman than those in use at present.

The present sand-pump reel in general use consists of a wooden friction-pulley on the end of the reel which acts by contact with the wooden band-wheel of the band-wheel frame, the friction-pulley before mentioned having a beveled face to bring the reel at the proper angle and the band-wheel a square face.

The objections to the present method are: First, that it is clumsy, difficult to manage, and, with all the improvements that have been made, it takes much time to operate. Second, that the action of the beveled friction-pulley upon the square-faced band-wheel rapidly destroys both.

For the purpose of providing for these objections I have the reel B fixed upon the shaft S' resting on the bearings C C. Also the shaft S S, revolved by the double crank E of the small upright engine H K P, for which a separate steam-pipe is taken from the boiler of the well-engine. The shafts S' and S S are provided with the fly-wheels F F to regulate their motion, and are connected by the clutch D, formed of the two circular disks $f$ and $e$, with the pins or teeth $b$ $b$ on the disk $f$ fitting into corresponding holes on disk $e$, which slides horizontally upon the shaft S', and is thrown in and out of gear by the lever $g$.

Claim.

I do not claim the vertical engine H P K, nor the reel B; but

I claim as my invention—

The combination of the shafts S S and S', and reel B, with the clutch D, the fly-wheels F F, the double crank E, the engine H P K, and the stands A A A A, all constructed and arranged substantially as and for the purposes hereinbefore set forth.

JAMES A. FLEMING.

Witnesses:
 ARCHIE R. GRAY,
 J. H. BROAS, Jr.

(51)